US012276621B2

(12) United States Patent
Fujimaki (10) Patent No.: US 12,276,621 B2
(45) Date of Patent: Apr. 15, 2025

(54) METHOD FOR IDENTIFYING FOIL POSITION IN POWER STORAGE DEVICE AND METHOD FOR CALCULATING INTER-FOIL DISTANCE IN POWER STORAGE DEVICE

(71) Applicant: Prime Planet Energy & Solutions, Inc., Tokyo (JP)

(72) Inventor: Hisataka Fujimaki, Nisshin (JP)

(73) Assignee: PRIME PLANET ENERGY & SOLUTIONS, INC., Tokyo (JP)

( * ) Notice: Subject to any disclaimer, the term of this patent is extended or adjusted under 35 U.S.C. 154(b) by 377 days.

(21) Appl. No.: 18/058,269

(22) Filed: Nov. 23, 2022

(65) Prior Publication Data

US 2023/0236139 A1     Jul. 27, 2023

(30) Foreign Application Priority Data

Jan. 25, 2022    (JP) ................... 2022-009417

(51) Int. Cl.
*G01N 23/046*     (2018.01)
*G01N 23/083*     (2018.01)

(52) U.S. Cl.
CPC ......... *G01N 23/046* (2013.01); *G01N 23/083* (2013.01); *G01N 2223/04* (2013.01); *G01N 2223/419* (2013.01); *G01N 2223/60* (2013.01)

(58) Field of Classification Search
CPC .............. G01N 23/046; G01N 23/083; G01N 2223/04; G01N 2223/419; G01N 2223/60
See application file for complete search history.

(56) References Cited

U.S. PATENT DOCUMENTS

| 2017/0065234 A1* | 3/2017 | Rump | .................... G06T 7/75 |
| 2021/0167413 A1* | 6/2021 | Imoto | ...................... B60L 50/64 |
| 2021/0167470 A1* | 6/2021 | Matsui | .................. H01M 4/386 |

FOREIGN PATENT DOCUMENTS

| JP | 2006-134697 A | 5/2006 |
| JP | 2013-224846 A | 10/2013 |
| JP | 2013-229189 A | 11/2013 |
| JP | 2016-015371 A | 1/2016 |
| WO | 2016/114257 A1 | 7/2016 |
| WO | 2020/031432 A1 | 2/2020 |
| WO | 2020031431 A1 | 2/2020 |

* cited by examiner

*Primary Examiner* — Dani Fox
*Assistant Examiner* — Casey Bryant
(74) *Attorney, Agent, or Firm* — HAUPTMAN HAM, LLP (57) ABSTRACT

A method for identifying a foil position in a power storage device includes: analyzing the power storage device by X-ray CT analysis to obtain an X-ray absorbed amount at each position; acquiring an on-path X-ray absorbed amount at each on-path position on a specific imaginary line passing through an electrode sheet; and identifying a foil position of an electrode foil through which the specific imaginary line passes, based on the on-path X-ray absorbed amount. The foil position identifying includes fitting to determine an approximate curve that changes to fit a change in the on-path X-ray absorbed amount in a fitting region and generates a single peak in the fitting region, and estimating a foil position of a single electrode foil from the on-path position corresponding to the single peak of the determined approximate curve.

8 Claims, 6 Drawing Sheets

METHOD FOR IDENTIFYING FOIL POSITION IN POWER STORAGE DEVICE AND METHOD FOR CALCULATING INTER-FOIL DISTANCE IN POWER STORAGE DEVICE

CROSS-REFERENCE TO RELATED APPLICATIONS

This application is based upon and claims the benefit of priority to Japanese Patent Application No. 2022-009417 filed on Jan. 25, 2022, the entire contents of which are incorporated herein by reference.

BACKGROUND

Technical Field

The present disclosure relates to a method for identifying a foil position of an electrode foil of an electrode sheet in a power storage device, and a method for calculating an inter-foil distance in the power storage device, using the former method, i.e., an inter-foil distance between electrode foils having the same polarity, adjacently located with an electrode foil having a different polarity interposed therebetween, or an inter-foil distance between adjacent electrode foils having mutually different polarities.

Related Art

In some cases, it is desirable to analyze or inspect, in a nondestructive manner, the internal structure of a power storage device, as typified by a secondary battery, such as a lithium-ion secondary battery. For example, it may be desired to detect whether a stacked or laminated state of electrode sheets, i.e., positive and negative electrode sheets, constituting an electrode body of a power storage device is proper or not and changes over time in this stacked state, and how large the distance between the electrodes is and changes over time in this distance.

In those cases, the X-ray computed tomography (CT) analysis with an X-ray CT device using X-rays may be used. For example, WO 2020/031431A1 discloses an example to obtain line profiles of a secondary battery with the X-ray CT analysis, and identify foil positions of positive and negative electrode foils of a plurality of positive and negative electrode sheets of the secondary battery.

SUMMARY

Technical Problems

However, in some cases, the distance from an X-ray source to a power storage device to be inspected by irradiation of X-rays must be set large for example due to the large dimension of the power storage device, resulting in a low positional resolution of an X-ray absorbed amount at each position obtained by the X-ray CT analysis and a low contrast due to high energy of the X-rays irradiated to the power storage device. For those reasons, the obtained tomographic images and line profiles, representing the magnitudes of the X-ray absorbed amounts, could not exhibit clear peaks indicating the foil positions of the positive electrode foils and the negative electrode foils. Thus, the foil positions of the electrode foils contained in the electrode sheets could not be clearly identified only by the tomographic images and the line profiles.

The present disclosure has been made to address the above problems and has a purpose to provide a method for appropriately identifying a foil position of an electrode foil contained in an electrode sheet of a power storage device and a method for calculating, using the former foil position identifying method, an inter-foil distance between adjacent electrode foils of the same polarity, between which an electrode foil of a different polarity is interposed, or an inter-foil distance between adjacent electrode foils of mutually different polarities.

Means of Solving the Problems

To achieve the above-mentioned purpose, one aspect of the present disclosure provides (1) a method for identifying a foil position in a power storage device provided with an electrode sheet including an electrode foil, the method comprising: analyzing the power storage device by X-ray CT analysis using irradiation of an X-ray to obtain an X-ray absorbed amount at each of a plurality of positions in the power storage device; acquiring, based on the obtained X-ray absorbed amount, an on-path X-ray absorbed amount that is the X-ray absorbed amount at each of on-path positions on a specific imaginary line passing through the electrode sheet of the power storage device; and identifying, based on the acquired on-path X-ray absorbed amount, a foil position of the electrode foil of the electrode sheet which the specific imaginary line passes through, wherein the identifying includes: fitting to determine an approximate curve that changes to fit a change in the on-path X-ray absorbed amount in a fitting region of the specific imaginary line, the fitting region including a single electrode foil that is the electrode foil, and further that generates a single peak in the fitting region; and estimating the foil position of the single electrode foil from the on-path position corresponding to the single peak of the determined approximate curve within the fitting region of the specific imaginary line.

According to the foregoing method for identifying a foil position in a power storage device, which will be also referred to as a power-storage-device foil position identifying method, the fitting is performed to determine the approximate curve that generates a single peak within the fitting region and the estimating is performed to estimate the foil position of the single electrode foil in the fitting region from the position on the specific imaginary line, i.e., an on-path position, corresponding to the single peak of the approximate curve. Thus, the foil position of the electrode foil of the electrode sheet can be identified.

Examples of the energy storage device to be subjected to the X-ray CT analysis include secondary batteries such as lithium-ion secondary batteries, and capacitors such as lithium-ion capacitors. As the electrode body included in the power storage device, a laminated electrode body and a wound electrode body (e.g., a cylindrical wound electrode body and a flat wound electrode body) are available. The electrode sheet to be inspected includes for example a positive electrode sheet, a negative electrode sheet, and a bipolar electrode sheet.

(2) The method for identifying a foil position in a power storage device described in (1) may be configured such that the specific imaginary line is an imaginary line that passes in a straight line and perpendicularly through the electrode foil of the electrode sheet which the specific imaginary line passes through, the electrode sheet includes electrode layers provided one on each surface of the electrode foil, the electrode layers having the same thickness, and the approximate curve determined in the fitting is a curved line symmetric about the on-path position corresponding to the single peak.

In the foregoing foil position identifying method, the specific imaginary line passes in a straight line and perpendicularly through the electrode foil of the electrode sheet. Thus, changes in the X-ray absorbed amount within the fitting region represent differences in composition (X-ray absorption coefficient) of each part of the electrode sheet in the thickness direction thereof. The approximate curve is a curve symmetric about the on-path position corresponding to the single peak, in relation to the specific imaginary line, that is, a bilaterally symmetric curve. Accordingly, the on-path position of this approximate curve corresponding to the single peak is presumed to be the foil position of the single electrode foil, so that the foil position can be identified with high accuracy.

The symmetric curve about the on-path position corresponding to the single peak, which will be used as the approximate curve, may include for example Gaussian, Lorentz, quadratic, and cos functions.

(3) The method for identifying a foil position in a power storage device described in (1) or (2) may be configured such that the electrode sheet includes a plurality of one-polarity electrode sheets, which are positive electrode sheets or negative electrode sheets, the electrode foil includes a plurality of one-polarity electrode foils, which are positive electrode foils or negative electrode foils, the specific imaginary line passes through the plurality of one-polarity electrode foils, the identifying includes performing the fitting and the estimating on each of the one-polarity electrode foils to identify the foil position of each of the one-polarity electrode foils, and the method further includes estimating a foil position of another-polarity electrode foil located between the one-polarity electrode foils adjacent to each other, from a pair of the identified foil positions of the adjacent one-polarity electrode foils.

When the positive electrode layer of each positive electrode sheet is made of for example an alkali metal transition metal oxide, such as $LiNiO_3$, and the negative electrode layer of each negative electrode sheet is made of for example a carbon-based material, such as graphite, the X-ray absorbed amount of each positive electrode layer is relatively large and the X-ray absorbed amount of each negative electrode layer is relatively small. When the power storage device including the thus configured positive and negative electrode sheets is subjected to the X-ray CT analysis to obtain the X-ray absorbed amount at each point in the power storage device, a large X-ray absorbed amount is obtained at each position of the positive electrode layers of the positive electrode sheets, so that the peak appears clearly, whereas a small X-ray absorbed amount is obtained at the position of the negative electrode layer of the negative electrode sheet, so that the peak appears less clearly.

For this reason, when the positive electrode sheet is subjected to the identifying of the foil position from the X-ray absorbed amount obtained at each of the positions by the X-ray CT analysis, it is relatively easy to identify the positive electrode foil position of the positive electrode foil, e.g., sandwiched between two positive electrode layers, from the positions of the positive electrode layers of the positive electrode sheet at which the X-ray absorbed amount is detected as a large value. However, even if the negative electrode sheet is subjected to the foil position identifying, it may be relatively difficult to identify the negative electrode foil position of the negative electrode foil, e.g., sandwiched between two negative electrode layers, from the positions of the negative electrode layers of the negative electrode sheet at which the X-ray absorbed amount is detected as a small value.

In contrast, the foil position identifying method described in (3), it is possible to appropriately identify the foil position of each of the plurality of electrode foils having one polarity and also to easily estimate the foil position of the other-polarity electrode foil of the electrode sheet having the other polarity, placed between the electrode sheets of the same, one polarity.

For instance, assuming that a positive electrode sheet is provided with positive electrode layers having the same thickness, one on each side of a positive electrode foil, a negative electrode sheet is provided with negative electrode layers having the same thickness, one on each side of a negative electrode foil, and separators each interposed between the positive electrode sheet and the negative electrode sheet have the same thickness as each other, the estimating of a foil position of the other polarity electrode foil may include for example estimating a negative electrode foil position of the negative electrode foil from an on-path position at a middle point between a pair of the estimated positions of the positive electrode foils on the specific imaginary line. However, this other-polarity foil position estimating is not limited to above, but may adopt any manners capable of appropriately estimating the foil position of an electrode foil of an other-polarity electrode sheet from the foil position of an electrode foil of a one-polarity electrode sheet based on the layer composition and thickness of the positive and negative electrode sheets, the thickness of the separators, and the presumed specific imaginary line, which are used in the power storage device.

(4) Another aspect of the present disclosure further provides a method for calculating an inter-foil distance, the method comprising: by use of the foil position of the electrode foil identified by the method for identifying a foil position in the power storage device described in one of (1) to (3), calculating an inter-foil distance between the electrode foils of the same polarity, adjacently located with the electrode foil of a different polarity interposed therebetween, or between the electrode foils of mutually different polarities, adjacently located to each other.

According to this power storage device inter-foil distance calculating method, even for the power storage device in which only unclear changes in on-path X-ray absorbed amount are obtained by the X-ray CT analysis alone, it is possible to appropriately identify the foil position of each electrode foil and further appropriately calculate the inter-foil distance between the adjacent electrode foils of the same polarity, located with another electrode foil of a different polarity opposite to the former polarity interposed therebetween, or between the adjacent electrode foils of the mutually different polarities.

DETAILED DESCRIPTION OF THE EXEMPLARY EMBODIMENTS

Figure 1:
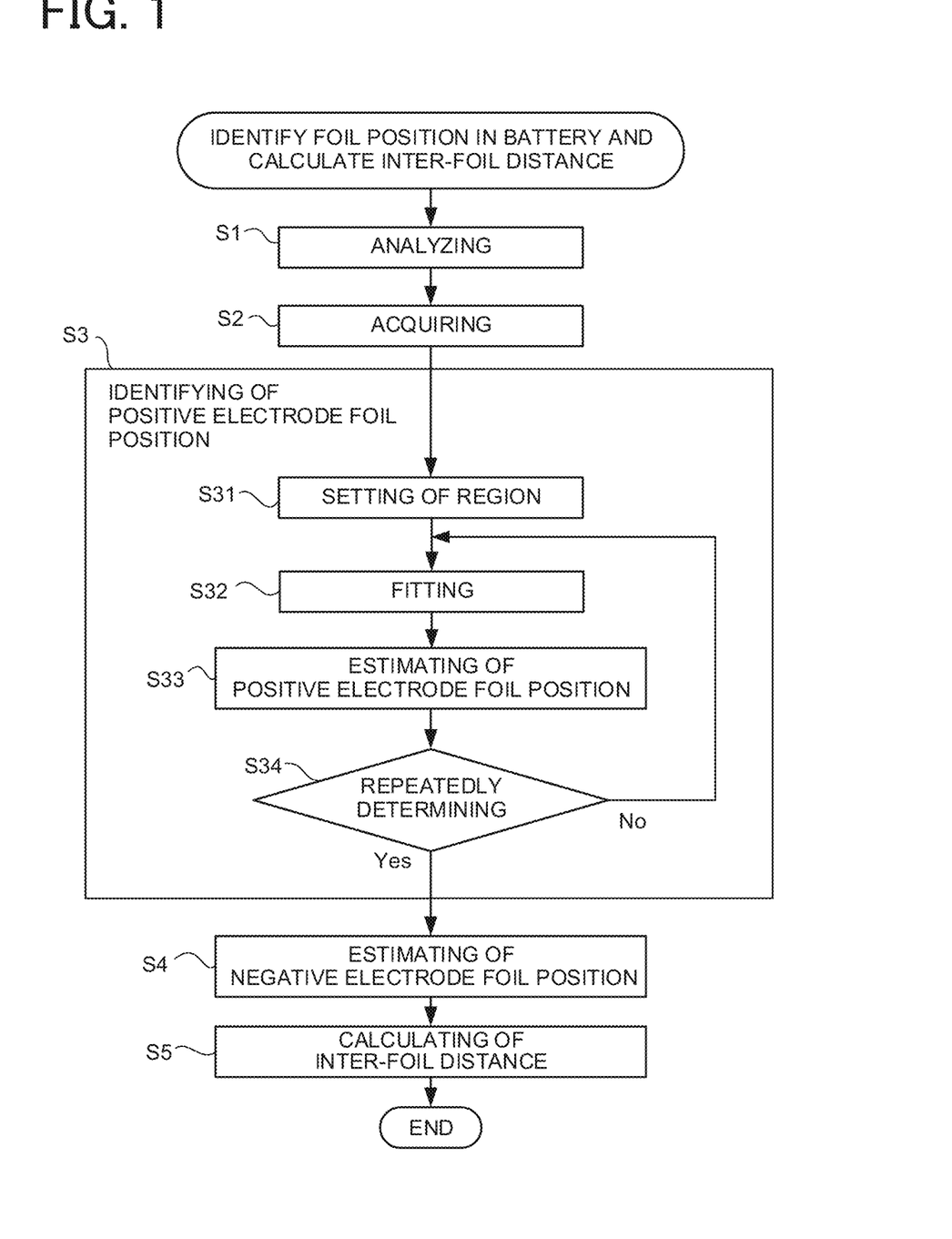
FIG. 1 is a flowchart showing steps of a method for identifying a foil position in a battery and a method for calculating an inter-foil distance in the battery in an embodiment.
Figure 2:
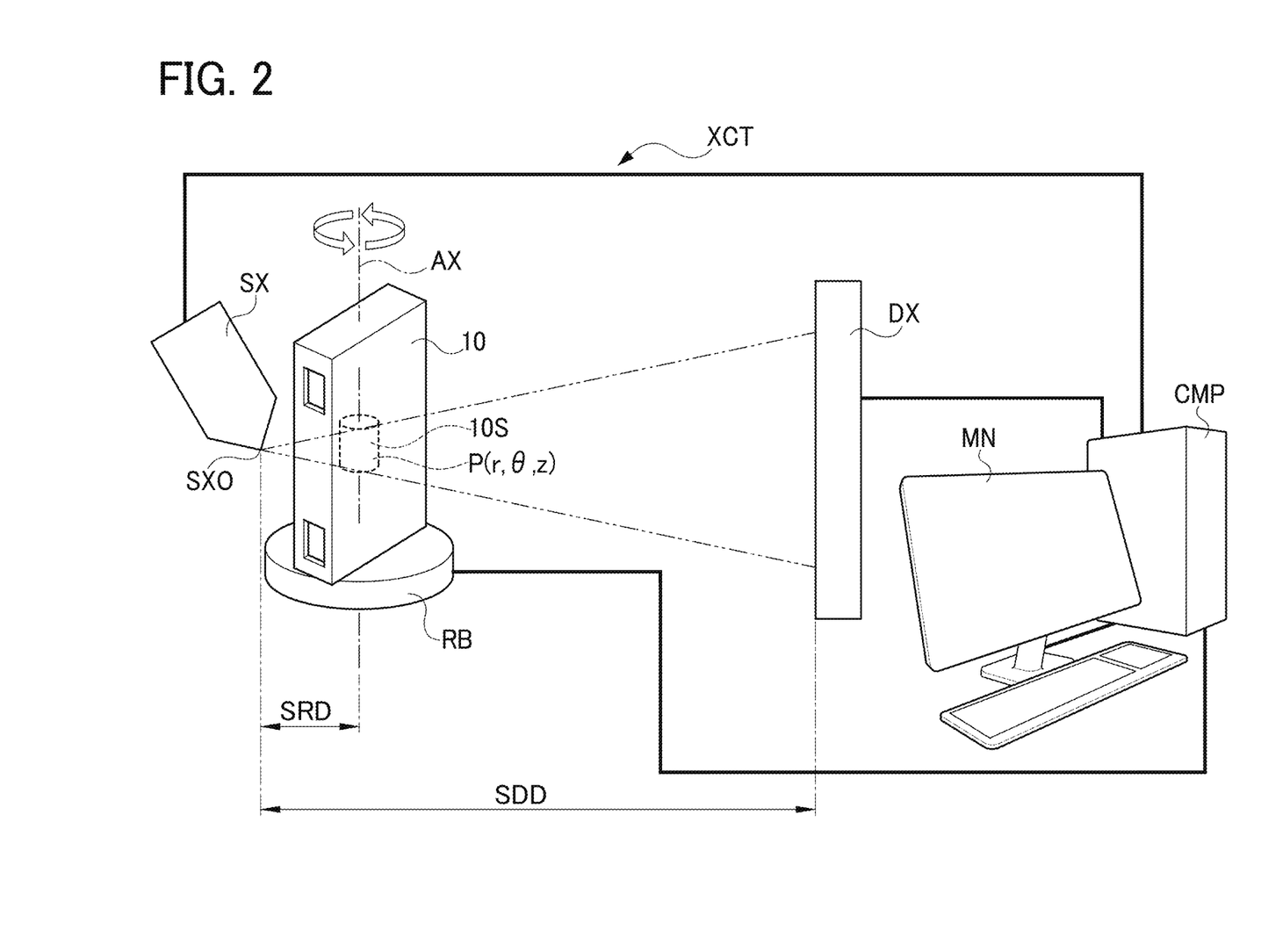
FIG. 2 is an explanatory diagram showing how to obtain an X-ray absorbed amount at each position in an analyzing step in which the battery is subjected to the X-ray CT analysis using an X-ray CT analyzer in the embodiment.

A detailed description of an embodiment of this disclosure will now be given referring to the accompanying drawings. FIG. 1 is a flowchart showing steps of a method for identifying a foil position and a method for calculating an inter-foil distance in a battery 10 in the present embodiment. An X-ray CT analyzer XCT, which is used for determination of foil positions and calculation of inter-foil distances in the battery 10, includes, as shown in FIG. 2, an X-ray source SX that emits X-rays in a conical shape from an X-ray focal point SXO, an X-ray detector DX that detects the X-rays emitted from the X-ray source SX, and a turntable RB rotatable around a rotation axis AX to rotate an object to be inspected, i.e., the battery 10 in the present example, which is placed on the turntable RB. Furthermore, the X-ray CT analyzer XCT also includes a processing computer CMP that controls the above components or parts and computes, based on X-ray intensity data detected by the X-ray detector DX, an X-ray absorbed amount AB $(r, \theta, z)$ at each of a plurality of positions P $(r, \theta, z)$ in the battery 10, a tomographic image that represents the distribution of the X-ray absorbed amounts AB on an arbitrary imaginary cross-section, a graph that plots changes in the X-ray absorbed amount along an arbitrary specific imaginary line HT, that is, an absorbed-amount profile, and a monitor MN displaying obtained various data, tomographic images, absorbed-amount profiles, and others.

In the present embodiment, in an analyzing step S1, the battery 10 to be inspected is firstly subjected to the X-ray CT analysis using the X-ray CT analyzer XCT, and the processing computer CMP obtains an X-ray absorbed amount AB $(r, \theta, z)$ at each of the positions P $(r, \theta, z)$ in a circular-columnar inspected region 10S indicated by broken lines under irradiation of X-rays, wherein the letters inside the parentheses $(r, \theta, z)$ indicate the coordinates in the cylindrical coordinate system.

The ratio of a first distance SRD from the X-ray focal point SXO to the rotation axis AX to a second distance SDD from the X-ray focal point SXO to the X-ray detector DX is the magnification ratio R, which is expressed by R=SDD/SRD. In general, the larger the magnification ratio is, the higher the resolution of the X-ray absorbed amount AB $(r, \theta, z)$. The second distance SDD is usually set to a fixed dimension due to the restrictions in the entire shape of the X-ray CT analyzer XCT. In contrast, the first distance SRD is variable by changing the position of the turntable RB. However, if the inspected object, e.g., battery 10, has a large size, the first distance SRD has to be set large to prevent interference of the battery 10 with the X-ray source SX during rotation of the battery 10 on the turntable RB. This results in a smaller magnification ratio R and hence a low resolution of the calculated X-ray absorbed amount AB $(r, \theta, z)$. Furthermore, for such a large-sized inspected object, e.g., battery 10, the distance of the X-rays penetrating through the inspected object is long, so that the intensity of the X-rays that reach the X-ray detector DX is low. In this respect, the resolution of the X-ray absorbed amount AB $(r, \theta, z)$ is also apt to be low. If the energy of the X-rays to be emitted from the X-ray focal point SXO of the X-ray source SX is set higher to prevent the above defects, the intensity contrast of the X-rays that reach the X-ray detector DX is lower. In this case, similarly, the resolution of the X-ray absorbed amount AB $(r, \theta, z)$ tends to be low.

Figure 3:
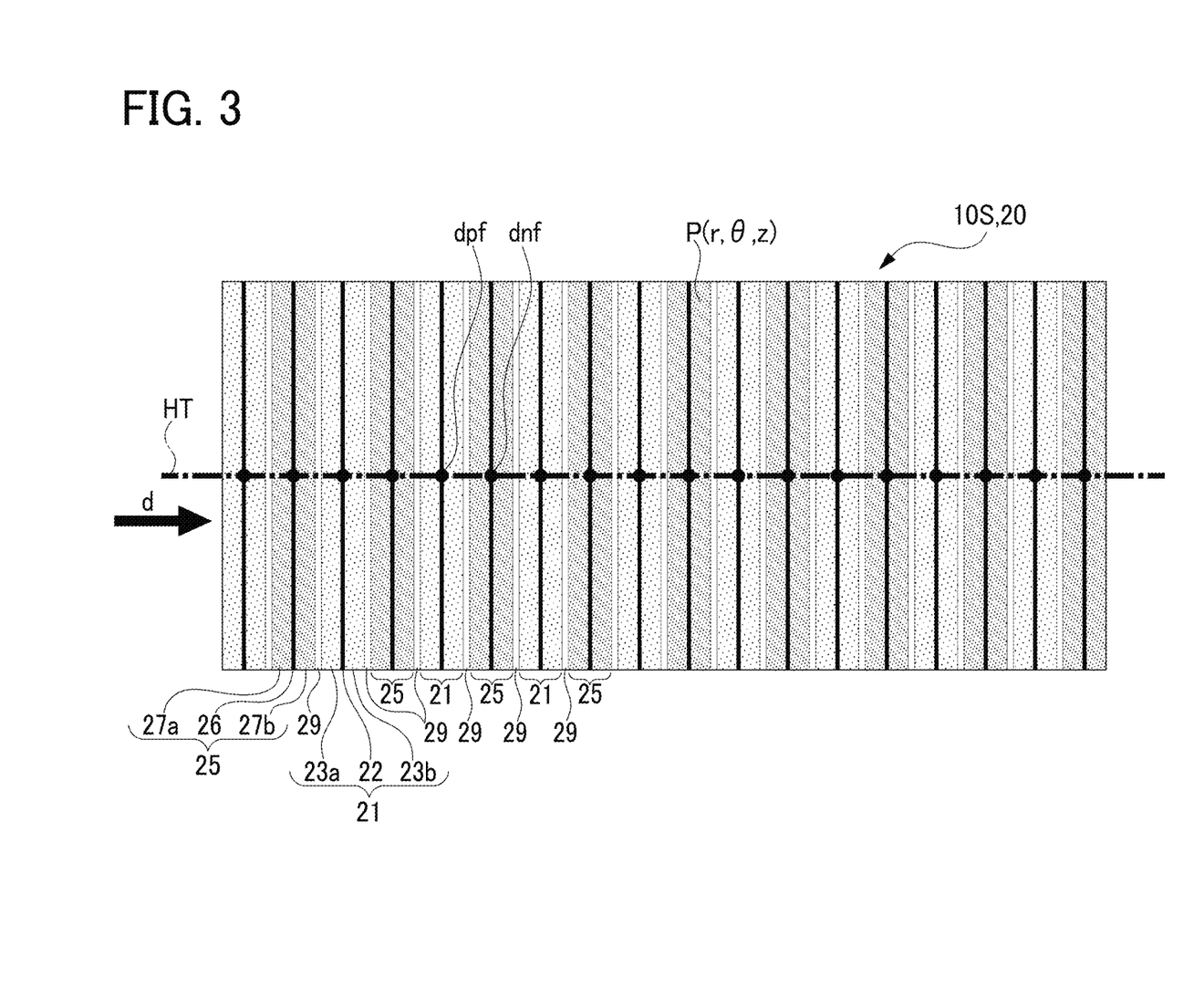
FIG. 3 is an explanatory diagram showing a layer configuration of an electrode body in an inspected region of the battery in the embodiment.
Figure 4:
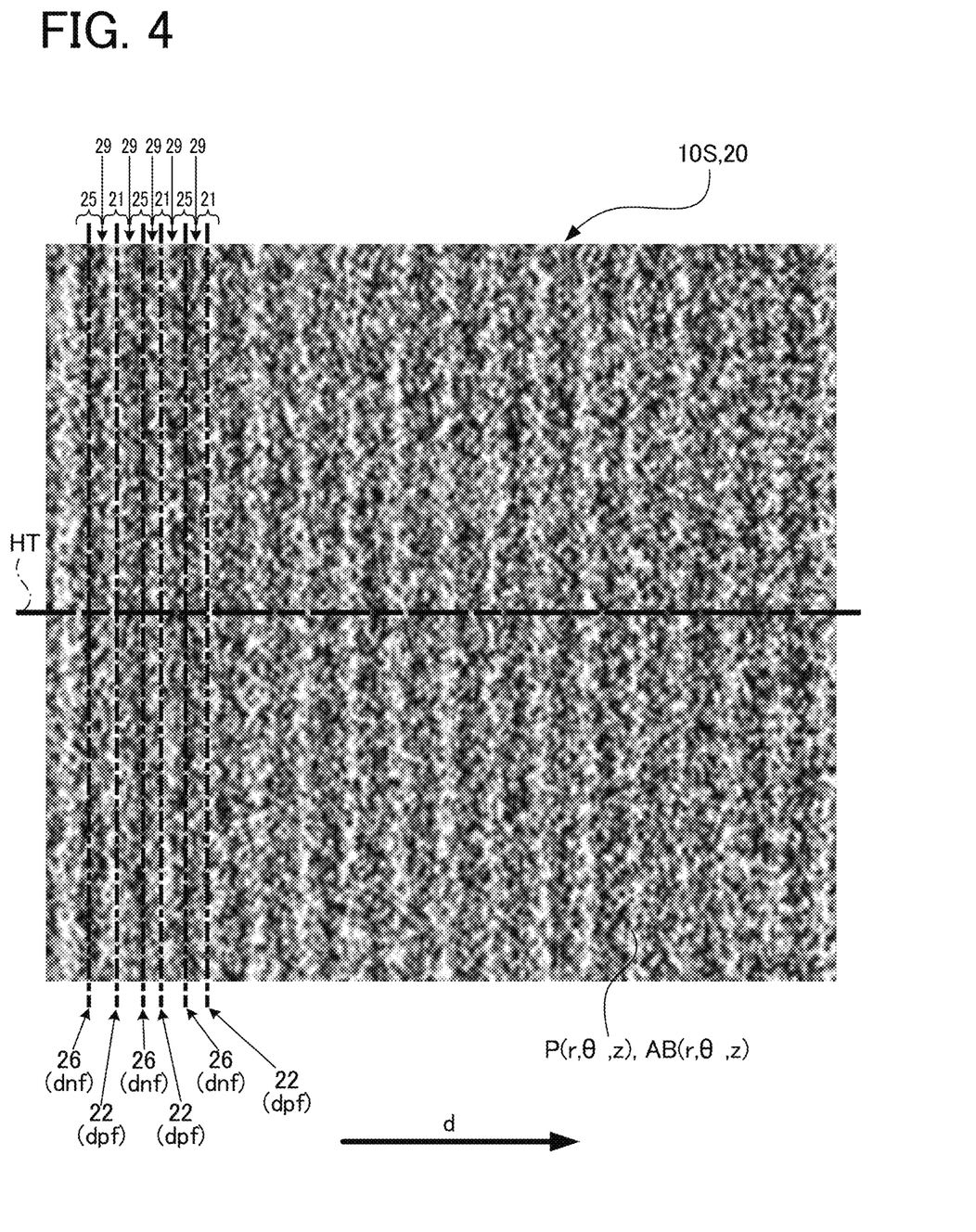
FIG. 4 is an example of a tomographic image of the battery, created from the X-ray absorbed amount at each position obtained in the X-ray CT analysis.

Accordingly, for example, when a part of a laminated electrode body 20 of the battery 10, in which positive electrode sheets 21 and negative electrode sheets 25 are stacked alternately with separators 29 interposed therebetween as shown in FIG. 3, is subjected to the X-ray CT analysis, a tomographic image of the battery 10 with low resolution may be obtained as exemplified in FIG. 4.

As shown in FIG. 3, each of the positive electrode sheets 21 includes a positive electrode foil 22 made of aluminum, and positive electrode layers 23a and 23b having the same thickness, which are formed one on each side of the positive electrode foil 22. For example, each of the positive electrode layer 23a and 23b includes a positive active material containing transition metal elements, such as $LiNi_{1/3}Co_{1/3}Mn_{1/3}O_2$, and thus has a higher X-ray absorption coefficient than the positive electrode foil 22. On the other hand, each of the negative electrode sheets 25 includes a negative electrode foil 26 made of copper, and negative electrode layers 27a and 27b having the same thickness, which are formed one on each side of the negative electrode foil 26. For example, each of the negative electrode layers 27a and 27b includes a negative electrode active material made of carbon-based material, such as graphite, and thus has a lower X-ray absorption coefficient than the negative electrode foil 26, positive electrode foil 22, and positive electrode layers 23a and 23b. The separators 29 made of for example polyethylene similarly have a lower X-ray absorption coefficient than the negative electrode foil 26, positive electrode foil 22, and positive electrode layers 23a and 23b.

In FIG. 4, therefore, among the positions P $(r, \theta, z)$ on the cross-section of the inspected region 10S, the sites having the positive electrode sheets 21 each including the positive electrode layers 23a and 23b, which absorb a large amount of X-rays, appear relatively white, whereas the sites having the negative electrode sheets each including the negative electrode layers 27a and 27b, which absorb a small amount of X-rays, appear relatively black. The positive electrode foils 22, negative electrode foils 26, and separators 29 are each thinner than, e.g., about 1/10 or less of, each of the positive electrode layers 23a and 23b and the negative electrode layers 27a and 27b. It is therefore difficult from the tomographic image in FIG. 4 to clearly distinguish the positive electrode foils 22 and the negative electrode foils 26 and identify their positions.

In an acquiring step S2, then, using the processing computer CMP, an on-path X-ray absorbed amount AB (d) is obtained, corresponding to the X-ray absorbed amount AB $(r, \theta, z)$ at each on-path position d on the specific imaginary line HT passing through an electrode sheet of the battery 10, that is, the positive electrode sheet 21 or the negative electrode sheet 25. The on-path position d can also be expressed as the distance measured along the specific imaginary line HT from the origin that is an arbitrary position on the specific imaginary line HT. The present embodiment provides an example of the specific imaginary line HT assumed to be a specific imaginary line HT indicated by a straight, dashed-dotted line laterally extending in FIGS. 3 and 4 and perpendicularly passing through a plurality of positive electrode sheets 21 and a plurality of negative electrode sheets 25. In FIG. 3, the on-path positions d at the points where the specific imaginary line HT intersects the positive electrode foils 22 are assumed to be foil positions dpf of the positive electrode foils 22. Further, the on-path positions d at the points where the specific imaginary line HT intersects the negative electrode foils 26 are assumed to be foil positions dnf of the negative electrode foils 26.

Figure 5:
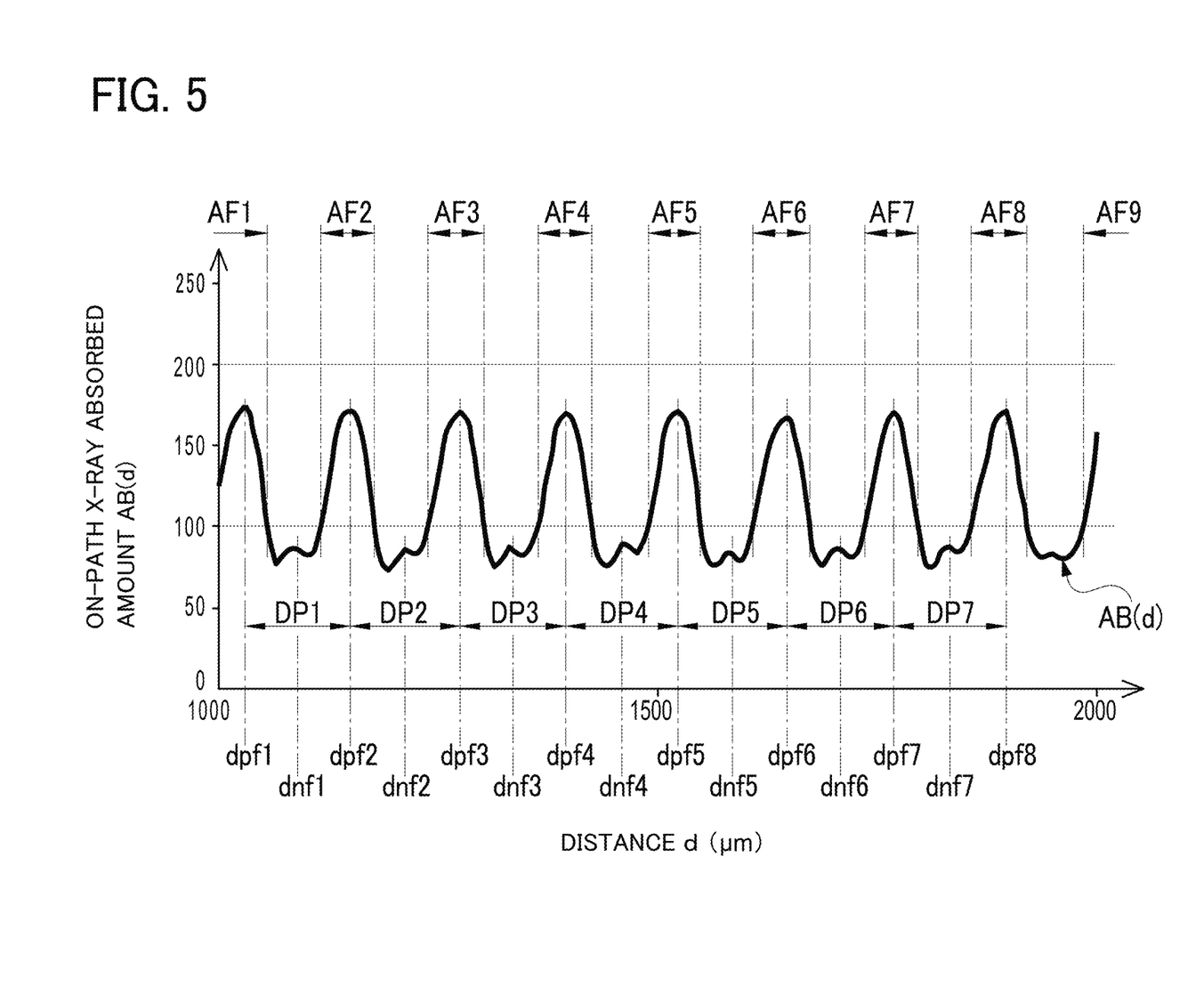
FIG. 5 is a graph showing examples of an on-path X-ray absorbed amount at each on-path position on a specific imaginary line in the battery, a foil position at each electrode, and an inter-foil distance in the embodiment.

FIG. 5 is a graph showing changes in magnitude of the on-path X-ray absorbed amount AB (d) at each on-path position d, i.e., the distance d from the origin, on the specific imaginary line HT. This graph represents an absorbed-amount profile. In the graph in FIG. 5, a plurality of crest segments with a maximum on-path X-ray absorbed amount AB (d) exceeding 150 appear corresponding to the positive electrode layers 23a and 23b of each positive electrode sheet 21 having a large X-ray absorbed amount, and further a plurality of trough segments appear corresponding to each negative electrode sheet 25 having a small X-ray absorbed amount. In each of the trough segments, a small peak is observed due to the existence of the negative electrode foil made of copper, which is thin in thickness but has a large X-ray absorption coefficient. However, as easily understood by comparison with FIGS. 7 and 8 of the Patent Document 1 (US: WO 2020/031431A1), it is difficult from only the graph in FIG. 5 to accurately identify the foil position dpf of each positive electrode foil 22 and the foil position dnf of each negative electrode foil 26.

In the present embodiment, therefore, in a positive electrode foil position identifying step S3, firstly, the foil positions dpf (e.g., dpf1 to dpf9) of the positive electrode foils 22 are each identified as follows. In a region setting step S31, the range of a fitting region AF (AF1 to AF9 in FIG. 5) including a single electrode foil, which is one of the positive electrode foils 22, is set on the specific imaginary line HT. Specifically, the ranges where the on-path X-ray absorbed amount AB (d) exceeds 100 in the graph in FIG. 5 are defined as fitting regions AF1 to AF9.

Then, a fitting step S32 and a positive electrode foil position estimating step S33 are repeated in a repeatedly-determining step S34 to identify the foil position dpf (e.g., dpf1 to dpf8) of the single positive electrode foil 22 in each fitting region AF (e.g., AF1 to AF9).

Figure 6:
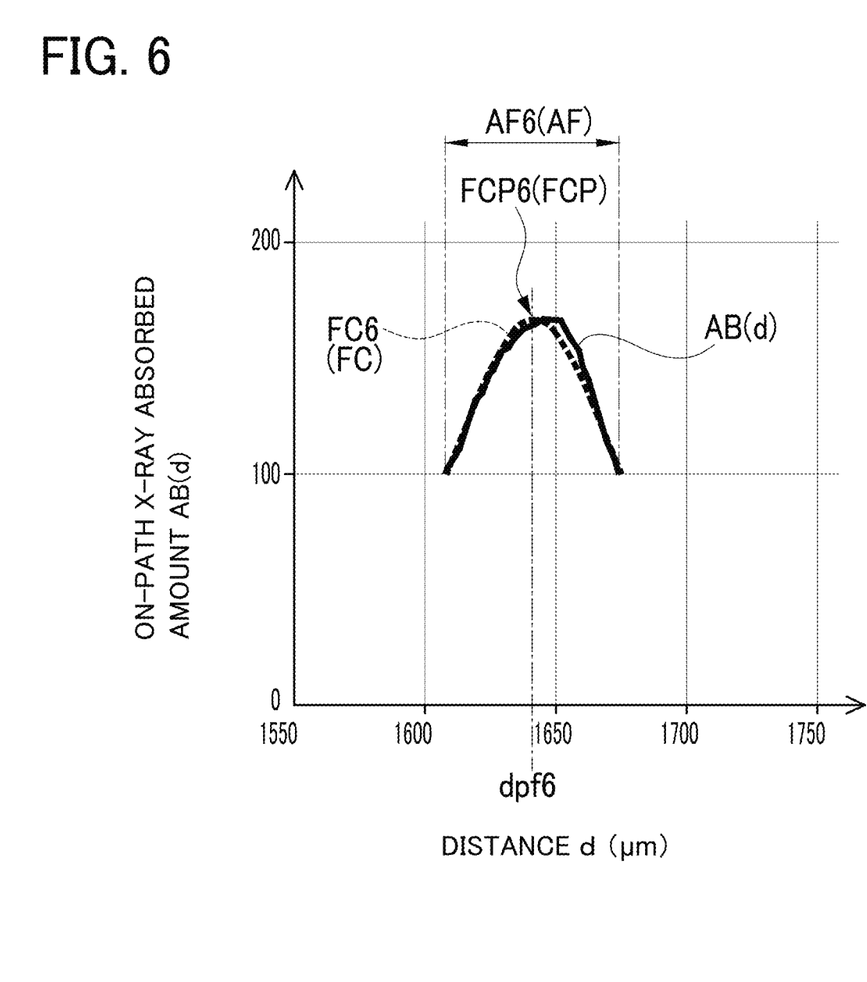
FIG. 6 is a graph showing examples of an on-path X-ray absorbed amount at each on-path position within a fitting region, an approximate curve, and an estimated foil position in the embodiment.

As shown in FIG. 6, for example, in the fitting step S32, an approximate curve FC6 is determined that changes to fit the on-path X-ray absorbed amount AB changing within the fitting region AF6 and generates a single peak FCP6 in the fitting region AF6, as indicated by a thick broken line in FIG. 6. In the present embodiment, a Gaussian function is used for the approximate curve FC6. This is because each positive electrode sheet 21 includes the positive electrode layers 23a and 23b having the same thickness, which are provided on both sides of the positive electrode foil 22, so that it is appropriate to make fitting of an approximate curve FC6 that is symmetric, or bilaterally symmetric, about the on-path position d (the foil position dpf) corresponding to the single peak FCP6, for the specific imaginary line HT (the distance d). This enables accurate identification of the foil position dpf1 and others. As alternatives, the symmetric approximate curve FC, for the specific imaginary line HT (the distance d), may be adopted from a Lorentz function, quadratic function, cosine function, and others.

In the positive electrode foil position estimating step S33, subsequently, a foil position dpf6 of the single positive electrode foil 22 is estimated from the on-path position d corresponding to the single peak FCP6 of the approximate curve FC6 determined in the fitting region AF6.

In the repeatedly-determining step S34, for each of the set fitting regions AF (e.g., AF1 to AF8), the fitting step S32 and the positive electrode foil position estimating step S33 are repeated until the approximate curve FC is determined in the fitting step S32 and the foil position dpf of each positive electrode foil 22 is estimated in the positive electrode foil position estimating step S33. This can estimate the foil position dpf (e.g., dpf1 to dpf8) of each positive electrode foil 22 included in each fitting region AF (see FIG. 5). In the above manner, out of the positive electrode foils 22 and the negative electrode foils 26, the foil positions dpf (e.g., dpf1 to dpf8) of the positive electrode foils 22 can be each identified.

In a negative electrode foil position estimating step S4, subsequently, using the foil positions dpf (e.g., dfp1 to dpf8) of the positive electrode foils 22 identified in the positive electrode foil position identifying step S3, foil positions dnf (e.g., dnf1 to dnf7) of the negative electrode foils 26, having a different polarity from the positive electrode foils, are each estimated. Specifically, based on a pair of the foil positions dpf (e.g., a pair of the foil position dpf1 and the foil position dpf2) identified on adjacent two of the positive electrode foils 22, a foil position dnf (e.g., dnf1) of the negative electrode foil 26 located between those adjacent positive electrode foils 22 is estimated. To be concrete, for example, the foil position dnf1 of each negative electrode foil 26 is estimated from the on-path position d at a middle point between the paired foil positions dpf1 and dpf2. The positive electrode layers 23a and 23b have the same thickness as each other, the negative electrode layers 27a and 27b also have the same thickness as each other, and the separators 29 have the uniform thickness. Similarly, the foil positions dnf2 to dnf7 of the negative electrode foils 26 are estimated from the foil positions dpf2 to dpf8 of the positive electrode foils 22 (see FIG. 5). Thus, this process can appropriately identify the foil positions dpf1, etc. of the plurality of electrode foils of one polarity (e.g., the positive electrode foils 22 in the present embodiment) and further easily estimate the foil positions dnf1, etc. of the electrode foils of the other polarity (e.g., the negative electrode foils 26 in the present embodiment), which are each sandwiched between the one-polarity electrode foils.

In an inter-foil distance calculating step S5, using the foil positions dpf1 to dpf8 of the positive electrode foils 22, identified in the positive electrode foil position identifying step S3, inter-foil distances DP1 to DP7 are each calculated as a distance between the positive electrode foils 22 having the same polarity, adjacently located with one negative electrode foil 26 having a different polarity opposite to the former polarity interposed therebetween. Thus, even in a power storage device which can only provide unclear changes in the on-path X-ray absorbed amount by the X-ray CT analysis alone (see FIG. 4), it is possible to appropriately identify the foil positions dpf1, etc. of the electrode foils (the positive electrode foils 22 in the present embodiment) and hence appropriately calculate the inter-foil distances DP1, etc., between the adjacent electrode foils having the different polarities from each other or the same polarity as each other, for example, between the positive electrode foils 22 of the same polarity in the present embodiment.

The present disclosure is described in the foregoing embodiment, but not limited thereto. The present disclosure may be embodied in other specific forms without departing from the essential characteristics thereof. For example, in the above embodiment, the foil positions dpf1, etc. of the positive electrode foils 22 are identified by determining the approximate curves FC that change to fit the on-path X-ray absorbed amount AB (d) changing in the corresponding fitting regions AF1, etc. In contrast, the foil positions dnf1, etc. of the negative electrode foils 26 are calculated from the foil positions dpf1, etc. of the positive electrode foils 22 without using the fitting of an approximate curve. This is because, in the example shown by the graph in FIG. 5, the magnitude of the on-path X-ray absorbed amount AB (d) obtained near a portion corresponding to each negative electrode foil 26 is small, and thus it is difficult to appropriately identify the foil positions dnf1, etc. of the negative electrode foils 26 using an approximate curve in the same manner as the foil positions dpf1, etc. of the positive electrode foils 22.

However, when the magnitude of the on-path X-ray absorbed amount AB (d) obtained near a portion corresponding to each negative electrode foil 26 is large enough to appropriately identify the foil position dnf of each negative electrode foil 26 using an approximate curve, the foil position dnf of each negative electrode foil 26 may also be identified using an approximate curve in the same manner as identification of the foil positions dpf1, etc. of the positive electrode foils 22. In this case, in the inter-foil distance calculating step, it is possible to calculate the inter-foil distance between the positive electrode foil 22 and the negative electrode foil 26, which are adjacent to each other and different in polarity, using the foil positions dpf1, etc. of the positive electrode foils 22 and the foil positions dnf1, etc. of the negative electrode foils 26.

In the embodiment, moreover, as shown in FIG. 3, the foil positions dpf1, etc. of the positive electrode foils 22 are identified by the X-ray CT analysis performed on the inspected region 10S of the laminated electrode body 20 of the battery 10, in which the positive electrode sheets 21 and the negative electrode sheets 25, each having a flat shape, are laminated, or stacked, with the separators 29 each having a flat shape, interposed therebetween. Further, the above embodiment describes the examples of estimating the foil positions dnf1, etc. of the negative electrode foils 26 or calculating the inter-foil distances DP1, etc., between the positive electrode foils 22. Similarly, the same method as in the above embodiment can also be applied to a flat part of a flat wound electrode body in which a positive electrode sheet and a negative electrode sheet are laminated, or stacked, in layers in a flat shape with a separator interposed therebetween.

In addition, the same method as in the above embodiment may also be applied to a round part of the flat wound electrode body, in which a positive electrode sheet and a negative electrode sheet are laminated and curved in a semi-cylindrical shape with a separator interposed therebetween, and also to a cylindrical wound electrode body, to identify the foil positions of the positive electrode foils and also estimate the foil positions and others of the negative electrode foils, and further calculate the inter-foil distance between the adjacent positive electrode foils.

REFERENCE SIGNS LIST

10 Battery (Power storage device)
21 Positive electrode sheet (Electrode sheet)
22 Positive electrode foil
23$a$, 23$b$ Positive electrode layer
23$at$, 23$bt$ Thickness (of positive electrode layer)
25 Negative electrode sheet (Electrode sheet)
26 Negative electrode foil
27$a$, 27$b$ Negative electrode layer
P(r, θ, z) Position
AB(r, θ, z) X-ray absorbed amount
HT Specific imaginary line
d On-path position
AF, AF1 to AF9 Fitting region
FC, FC6 Approximate curve
FCP, FCP6 Single peak (of approximate curve)
dpf, dpf1 to dpf8 Foil position (of positive electrode foil)
dnf, dnf1 to dnf7 Foil position (of negative electrode foil)
DP, DP1 to DP7 Inter-foil distance (between positive electrode foils)
S1 Analyzing step
S2 Acquiring step
S3 Positive electrode foil position identifying step (Foil position identifying step)
S32 Fitting step
S33 Positive electrode foil position estimating step (Foil position estimating step)
S4 Negative electrode foil position estimating step (Other-polarity electrode foil position estimating step)
S5 Inter-foil distance calculating step

What is claimed is:

1. A method for identifying a foil position in a power storage device provided with an electrode sheet including an electrode foil, the method comprising:
    analyzing the power storage device by X-ray CT analysis using irradiation of an X-ray to obtain an X-ray absorbed amount at each of a plurality of positions in the power storage device;
    acquiring, based on the obtained X-ray absorbed amount, an on-path X-ray absorbed amount that is the X-ray absorbed amount at each of on-path positions on a specific imaginary line passing through the electrode sheet of the power storage device; and
    identifying, based on the acquired on-path X-ray absorbed amount, a foil position of the electrode foil of the electrode sheet which the specific imaginary line passes through,
    wherein the identifying includes:
        fitting to determine an approximate curve that changes to fit a change in the on-path X-ray absorbed amount in a fitting region of the specific imaginary line, the fitting region including a single electrode foil that is the electrode foil, and further that generates a single peak in the fitting region; and
        estimating the foil position of the single electrode foil from the on-path position corresponding to the single peak of the determined approximate curve within the fitting region of the specific imaginary line.

2. The method for identifying a foil position in a power storage device according to claim 1, wherein
    the specific imaginary line is an imaginary line that passes in a straight line and perpendicularly through the electrode foil of the electrode sheet which the specific imaginary line passes through,
    the electrode sheet includes electrode layers provided one on each surface of the electrode foil, the electrode layers having the same thickness, and
    the approximate curve determined in the fitting is a curved line symmetric about the on-path position corresponding to the single peak.

3. The method for identifying a foil position in a power storage device according to claim 2, wherein
    the electrode sheet includes a plurality of one-polarity electrode sheets, which are positive electrode sheets or negative electrode sheets, the electrode foil includes a plurality of one-polarity electrode foils, which are positive electrode foils or negative electrode foils, the specific imaginary line passes through the plurality of one-polarity electrode foils, the identifying includes performing the fitting and the estimating on each of the one-polarity electrode foils to identify the foil position of each of the one-polarity electrode foils, and the method further includes estimating a foil position of another-polarity electrode foil located between the one-polarity electrode foils adjacent to each other, from a pair of the identified foil positions of the adjacent one-polarity electrode foils.

4. A method for calculating an inter-foil distance, the method comprising:

by use of the foil position of the electrode foil identified by the method for identifying a foil position in the power storage device according to claim 3, calculating an inter-foil distance between the electrode foils of the same polarity, adjacently located with the electrode foil of a different polarity interposed therebetween, or between the electrode foils of mutually different polarities, adjacently located to each other.

5. A method for calculating an inter-foil distance, the method comprising:

by use of the foil position of the electrode foil identified by the method for identifying a foil position in the power storage device according to claim 2, calculating an inter-foil distance between the electrode foils of the same polarity, adjacently located with the electrode foil of a different polarity interposed therebetween, or between the electrode foils of mutually different polarities, adjacently located to each other.

6. The method for identifying a foil position in a power storage device according to claim 1, wherein the electrode sheet includes a plurality of one-polarity electrode sheets, which are positive electrode sheets or negative electrode sheets, the electrode foil includes a plurality of one-polarity electrode foils, which are positive electrode foils or negative electrode foils, the specific imaginary line passes through the plurality of one-polarity electrode foils, the identifying includes performing the fitting and the estimating on each of the one-polarity electrode foils to identify the foil position of each of the one-polarity electrode foils, and the method further includes estimating a foil position of another-polarity electrode foil located between the one-polarity electrode foils adjacent to each other, from a pair of the identified foil positions of the adjacent one-polarity electrode foils.

7. A method for calculating an inter-foil distance, the method comprising:

by use of the foil position of the electrode foil identified by the method for identifying a foil position in the power storage device according to claim 6, calculating an inter-foil distance between the electrode foils of the same polarity, adjacently located with the electrode foil of a different polarity interposed therebetween, or between the electrode foils of mutually different polarities, adjacently located to each other.

8. A method for calculating an inter-foil distance, the method comprising:

by use of the foil position of the electrode foil identified by the method for identifying a foil position in the power storage device according to claim 1, calculating an inter-foil distance between the electrode foils of the same polarity, adjacently located with the electrode foil of a different polarity interposed therebetween, or between the electrode foils of mutually different polarities, adjacently located to each other.

* * * * *